(12) United States Patent
Ganai (10) Patent No.: US 11,755,799 B1
(45) Date of Patent: Sep. 12, 2023

(54) DIVERSIFYING STIMULUS GENERATION IN CONSTRAINED RANDOM SIMULATION BY LEARNING DISTRIBUTION HISTORY

(71) Applicant: Synopsys, Inc., Mountain View, CA (US)

(72) Inventor: Malay K. Ganai, San Jose, CA (US)

(73) Assignee: Synopsys, Inc.

( * ) Notice: Subject to any disclaimer, the term of this patent is extended or adjusted under 35 U.S.C. 154(b) by 857 days.

(21) Appl. No.: 16/775,509

(22) Filed: Jan. 29, 2020

Related U.S. Application Data (60) Provisional application No. 62/801,141, filed on Feb. 5, 2019.

(51) Int. Cl.
*G06F 30/3308* (2020.01)
*G06F 7/58* (2006.01)

(52) U.S. Cl.
CPC .......... *G06F 30/3308* (2020.01); *G06F 7/582* (2013.01); *G06F 2101/14* (2013.01)

(58) Field of Classification Search
USPC ....................................................... 716/100
See application file for complete search history.

(56) References Cited

U.S. PATENT DOCUMENTS

2018/0241414 A1\* 8/2018 Gresset ................. H04L 1/0042
2019/0172090 A1\* 6/2019 Fukuda ................... G06Q 30/02

\* cited by examiner

*Primary Examiner* — Bryce M Aisaka
(74) *Attorney, Agent, or Firm* — Park, Vaughan, Fleming & Dowler LLP; Laxman Sahasrabuddhe

(57) ABSTRACT

Techniques and systems for generating constrained random stimuli during functional verification of a design under verification (DUV) are described. Some embodiments can compute an observed probability distribution for each variable in a set of variables based on at least a first random solution generated using a set of constraints that are defined over the set of variables. The embodiments can then compute a correction probability distribution for each variable in the set of variables based on the observed probability distribution and an intended probability distribution. Next, while generating at least a second random solution using the set of constraints, the embodiments can select a random value for a given variable in the set of variables based on the correction probability distribution for the given variable. The observed probability distribution can be continuously updated and stored as constrained random stimuli are generated.

21 Claims, 9 Drawing Sheets

```
class myClass;
   rand bit[4:0] x,y,z,w;
   constraint c {
      x < y && y < z && z < w;
      solve w before z;
      solve z before y;
      solve y before x;
   }
endclass
covergroup myCover;
   x : coverpoint obj.x;
   y : coverpoint obj.y;
   z : coverpoint obj.z;
   w : coverpoint obj.w;
   cross x, y;
   cross y, z;
   cross z, w;
endgroup myCover cobj = new;
myClass obj = new;
obj.randomize();
cobj.sample();
```

```
class myClass;
   rand bit[4:0] x,y,z,w;
   constraint c {
      x < y && y < z && z < w;
      w dist {[0:9]:=10,
              [10:19] := 5,
              [20:31] := 1 }
   }
endclass
covergroup myCover;
   x : coverpoint obj.x;
   y : coverpoint obj.y;
   z : coverpoint obj.z;
   w : coverpoint obj.w;
   cross x, y;
   cross y, z;
   cross z, w;
endgroup myCover cobj = new;
myClass obj = new;
obj.randomize();
cobj.sample();
```

FIG. 5

```
class myClass;
   rand bit[4:0] x,y,z,w;
   constraint c {
      x < y+z && y < z+w && z < 2w;
      w inside {[0:12], [15:18],
                [21:31]}
   }
endclass
covergroup myCover;
   x : coverpoint obj.x;
   y : coverpoint obj.y;
   z : coverpoint obj.z;
   w : coverpoint obj.w;
   cross x, y;
   cross y, z;
   cross z, w;
endgroup myCover cobj = new;
myClass obj = new;
obj.randomize();
cobj.sample();
```

| Precision (#bits, b) | Signedness | Singleton Bins | | Interval Bins | |
|---|---|---|---|---|---|
| | | Bins | Count | Bins | Count |
| b = 5 | Signed | {-16,-15,...,0,1,...,15} | 32 | NA | 0 |
| b = 5 | Unsigned | {0,...,31} | 32 | NA | 0 |
| b < 5 | Signed | {-2^{b-1},...,0,1,...,2^{b-1}-1} | 2b | NA | 0 |
| b < 5 | Unsigned | {0,...,2^b-1}; | 2b | NA | 0 |
| b > 5 | Signed | {-16,-15,...,0,1,...,15} | 32 | {[-2^{b-1},2^{b-2}), [2^{b-2},2^{b-3}),...,[-2^5,-2^4), [2^4,2^5), [2^5,2^6),...,[2^{b-2},2^{b-1})} | 2(b-5) |
| b > 5 | Unsigned | {0,...,31} | 32 | {[2^5,2^6), [2^6,2^7),...[2^{b-1},2^b)} | b-5 |

DIVERSIFYING STIMULUS GENERATION IN CONSTRAINED RANDOM SIMULATION BY LEARNING DISTRIBUTION HISTORY

RELATED APPLICATION

This application claims benefit of U.S. Provisional Application Serial No. 62/801,141, filed 5 Feb. 2019, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to integrated circuit (IC) design. More specifically, this disclosure relates to efficiently diversifying stimulus generation in constrained random simulation by learning distribution history.

RELATED ART

Coverage closure is the holy grail of functional verification. IC design teams spend many verification cycles to achieve 100% coverage closure. constrained random verification (CRV) is a technique that is used in the IC design industry to meet the coverage goals.

In CRV, a constraint satisfiability solver (CS) is used to generate random input stimuli that satisfy a declarative set of user-specified constraints, and the generated random stimuli are used to validate given design properties through simulation. It is desirable to have a CRV framework that generates random input stimuli of a high quality and at a high rate. When the number of generated unique stimuli tend to fade, CRV suffers from "coverage plateau", i.e., the rate of progress towards coverage closure tends to flatten out. At this point, the effort needed to reach the "last mile" of coverage closure tends to grow exponentially. Formal verification techniques are computationally expensive, and are often used as a last resort.

Figure 1:
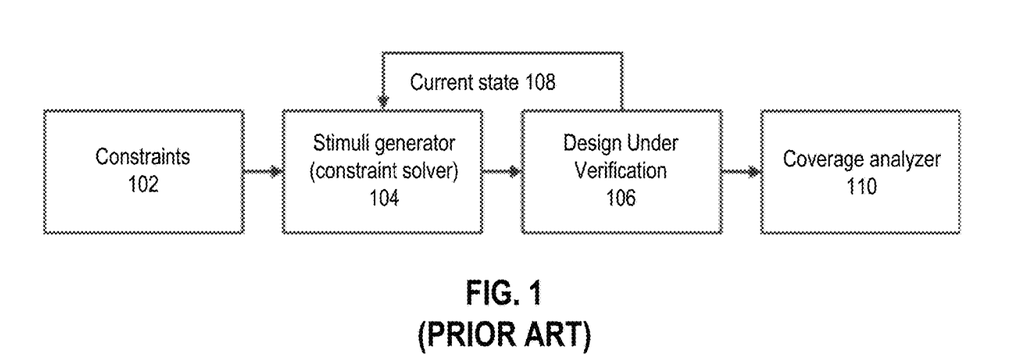
FIG. 1 illustrates an existing CRV framework.

FIG. 1 illustrates an existing CRV framework. Stimuli generator 104 (which can internally use a CS) can generate constrained random input stimuli for a design under verification (DUV) 106 at each state during simulation by solving a set of user-specified test-bench constraints 102 based on the current simulation state 108. These constraints implicitly capture the legal input environment and the directed test-scenarios. The generated stimuli are then provided to DUV 106 as input, and the behavior of DUV 106 is simulated. The results of the simulation are monitored in the new state by coverage analyzer 110 for coverage goals and assertion failures. The constrained random stimuli generation and the DUV simulation steps are repeated iteratively for each simulation state.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques for efficiently diversifying stimulus generation in constrained random simulation by learning distribution history. Specifically, some embodiments feature systems and techniques that efficiently compensates the unintended skewed stimuli distribution on-the-fly during the constraint random stimuli generation by monitoring and learning the distribution history and biasing the constraint random stimuli solver to match the expected diversity in the stimuli distribution in both intra- and inter-simulation runs, and thereby, effectively helping in faster coverage closure.

Some embodiments can generate constrained random stimuli during functional verification of a DUV in accordance with some embodiments described herein. Specifically, some embodiments can compute an observed probability distribution for each variable in a set of variables based on at least a first random solution generated using a set of constraints that are defined over the set of variables. The embodiments can then compute a correction probability distribution for each variable in the set of variables based on the observed probability distribution and an intended probability distribution. Next, while generating at least a second random solution using the set of constraints, the embodiments can select a random value for a given variable in the set of variables based on the correction probability distribution for the given variable.

In some embodiments, random solutions can be generated by a constraint satisfaction problem solver. In some embodiments, the intended probability distribution can be a uniform or non-uniform probability distribution. In some embodiments, using the correction probability distribution to select random values for variables can increase a diversity of the observed probability distribution as measured by Shannon entropy. In some embodiments, using the correction probability distribution to select random values for variables is expected to cause a Shannon entropy of the observed probability distribution to substantially match a Shannon entropy of the intended probability distribution. In some embodiments, the corrected probability distribution can be applied at a plurality of simulation states of the DUV. In some embodiments, the observed probability distribution can be computed over one or more simulation runs of the DUV. In some embodiments, the one or more simulation runs of the DUV can use different sets of constraints.

DETAILED DESCRIPTION

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

Ideally, a CS must generate (a) a valid stimulus within the tight time budget, and (b) a unique stimulus each time. However, simultaneously achieving both of these goals is an NP-Hard problem. Thus, the scalability and efficiency of CRV is heavily dependent on the performance of the constraint solver and the quality of the distribution of the generated stimuli. The latter requirement is particularly important as it can affect the number of verification cycles needed to meet coverage goals. A desirable quality would be that every legal stimuli gets an equal chance to be generated, thereby making the simulation effort spread evenly over the input space. In other words, a desirable distribution is one with maximum diversity, i.e., one with maximum entropy to improve the chances of reaching the corner cases.

The constraint solvers today are biased towards generating only a subset of all scenarios. The input stimuli generated typically have skewed distribution as these ATPG-/DPLL-based constraint solvers tend to have some preferred ordering of variable selection, evidently induced by two factors: (1) user-defined constraints such as "solve before" and "dist", and explicit ordering of constraints, and (2) solver's aggressive time budget. In other words, the solver tends to generate random stimuli that are skewed to solutions that are easy to find and/or that are conditionally biased by "solve before" and "dist" constraints. The current approach consequently results in unintended skewed distribution.

Using a quantitative measure (such as Shannon Entropy), we observed the diversity in distribution of input stimuli to be low, which relates directly to a skewed distribution. Moreover, we observed that the diversity to be low even across runs with different random seeds, indicating an inherent limitation with the current approach. Low diversity typically is an indicative of repetition of input stimuli, which clearly implies wasted simulation effort and low coverage.

Moreover, due to performance reasons, the current approaches do not provide full visibility of the distribution of input stimuli. Such a visibility would otherwise help users to spot over-constraints in the testbench. Embodiments described herein address above-mentioned issues in CRV without compromising the scalability and performance in any significant manner.

Embodiments described herein efficiently compensate the unintended skewed stimuli distribution on-the-fly during the constrained random stimulus generation by monitoring and learning the distribution history and biasing the constrained random stimulus solver to match the expected diversity in the stimuli distribution, in both intra- and inter-simulation runs, and thereby, effectively help in faster coverage closure.

Figure 2:
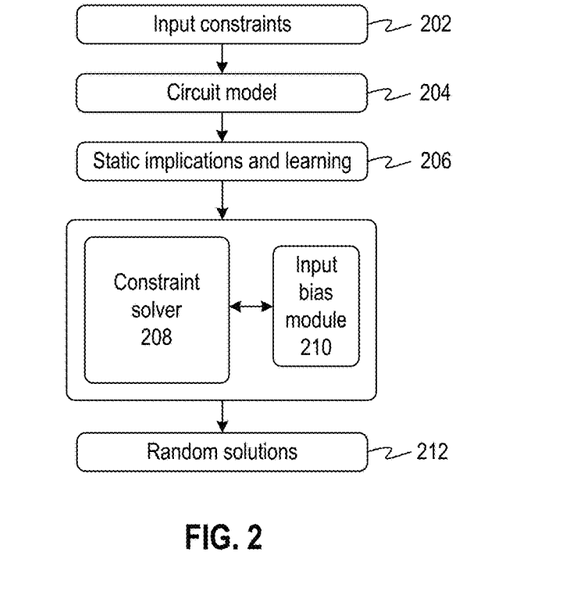
FIG. 2 illustrates a CRV framework in accordance with some embodiments described herein.

FIG. 2 illustrates a CRV framework in accordance with some embodiments described herein. Input constraints 202 define the allowed inputs. Circuit model 204 can be built based on input constraints 202, and static implications and learning 206 can be performed using circuit model 204. Next, constraint solver 208 can then be used to generate random solutions 212, which can then be provided as the constrained random stimuli to the DUV.

Some embodiments described herein feature input bias module 210, which interacts with constraint solver and stimuli generator 208, and addresses the limitation discussed above within the CRV framework. Specifically, the input bias module 210 constantly monitors and learns the distribution generated by constraint solver 208, computes the compensated distribution on-the-fly, and biases constraint solver 208 with the on-the-fly compensated distribution to nullify the skewedness in the distribution and to match the diversity in the generated stimuli distribution to that of expected distribution. Input bias module 210 does so without requiring changing the decision ordering of constraint solver 208 to minimize any adverse side effect on the solver's tight time budget.

More specifically, input bias module 210 includes the following features.

It efficiently stores the history of the generated stimuli. It creates a suitable number of singleton (i.e., single value) and interval (i.e., range values) bins per variable, and stores the relative frequency of the bin value generated. It updates the bins after each solve.

After each solve, it computes the observed probability distribution based on the stored distribution history of the variables.

After each solve, it computes "compensated" probability distribution of variables on-the-fly based on the observed and expected probability distribution. The compensated probability distribution aims to improve the diversity.

During solve stage, as demanded, it randomly picks a value from a given value set of a variable based on its compensated probability distribution.

During solve stage, as demanded, it randomly picks a range interval from a given set of range intervals for a variable based on its compensated probability distribution.

After each simulation run, it stores the observed distribution of variables in the disk. Before the subsequent simulation run, it loads the last observed distribution from the disk. This allows the distribution history to be used within one run and across multiple runs.

Some of the advantages of embodiments disclosed herein include:

Faster Coverage Closure: By focusing on improving the diversity in the input stimuli, it tends to generate different input stimuli (i.e., reduce repeatability), and thereby, helping in improving coverage closure. In other words, a given coverage goal tends to converge faster with the proposed technology than the current CRV technology with relatively low overhead. The empirical results on customer designs show the value and scalability of the proposed technology.

Scalability: Embodiments disclosed herein tend to scale well compared to the techniques based on formal verification methodology and can generate better or similar coverage with 2× faster convergence, as observed on example designs. Unlike formal verification methodologies, the method is applied without any change in the simulation use model.

Stability: The embodiments mitigate the stability issue of the current approach where the stimuli distribution can vary with the small change in specification such as in ordering constraints such as "solve before" or "dist" constraints and can vary with optimization in product release cycles. By compensating for the skewed distribution, the embodiments practically make the distribution oblivious to the changes in the testbench and the solver optimization.

Use cases: The technology has following three modes and can be used in any combination of these modes.
  a. Visualize Mode: Visualize the profile of the stimuli.
  b. Bias Mode (single run): Bias the solver to improve the diversity and improve the coverage metric without using any previous run history.
  c. Bias Mode (multiple runs): Bias the solver to improve the diversity and improve the coverage metric using previous run history.

The constraint solvers today (including the constraint solver in VCS®, which is a leading functional verification solution in the industry) are biased towards generating only a subset of all scenarios. The input stimuli generated typically have skewed distribution as these ATPG-/DPLL-based constraint solvers tend to have some preferred ordering of variable selection, evidently induced by two factors: (1) user-defined constraints such as "solve before" and "dist", and explicit ordering of constraints, and (2) solver's aggressive time budget. In other words, the solver tends to generate random stimuli that are skewed to solutions that are easy to find and/or that are conditionally biased by "solve before" and "dist" constraints. The current approach consequently results in unintended skewed distribution.

Using a quantitative measure (such as Shannon Entropy), we observed the diversity in distribution of input stimuli to be low, which relates directly to a skewed distribution. Moreover, we observed that the diversity to be low even across runs with different random seeds, indicating an inherent limitation with the current approach. Low diversity typically is an indicative of repetition of input stimuli, which clearly implies wasted simulation effort and low coverage.

Moreover, due to performance reasons, the current approaches do not provide full visibility of the distribution of input stimuli. Such a visibility would otherwise help users to spot over-constraints in the testbench. Embodiments described herein address above mentioned issues in CRV without compromising the scalability and performance in any significant manner.

In the following, three examples are presented to highlight the limitation of the current approach vis-à-vis the capability of the disclosed embodiments to mitigate the limitation.

Skewed Distribution Due to "Solve Before"

Figure 3:
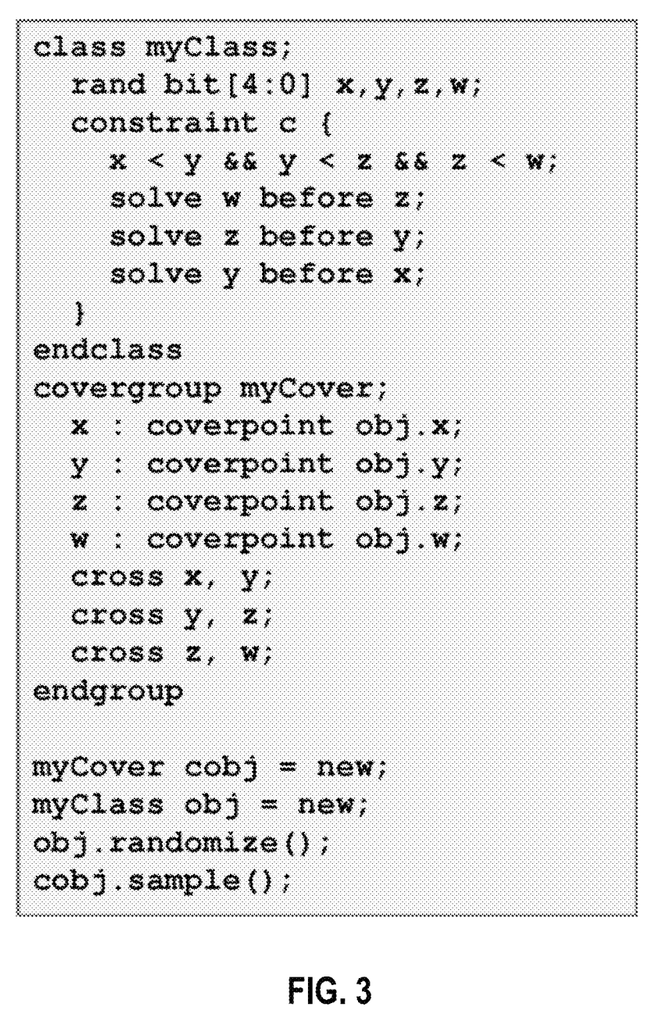
FIG. 3 illustrates a set of input constraints in accordance with some embodiments described herein.

FIG. 3 illustrates a set of input constraints in accordance with some embodiments described herein. To illustrate the limitation due to a "solve before" constraint, consider the example shown in FIG. 3. In this example, consider four variables each with value range [0:31], and with the constraint solve before that enforces the preferred ordering on the solver: w, z, y, x. Note the intended distribution on each variable is uniform over the legal value range. However, due to the ordering constraints, the true distribution (computed analytically) of the variables z, y, x are visibly skewed except for w as shown in FIG. 4.

Shannon entropy is used to measure the diversity of a given distribution. Given a probability $p_i$ of each possible value i of a variable v, the diversity of the distribution, given by $D(v)=-\Sigma_i p_i \ln(p_i)$. It is found that diversity of all variables except w is suboptimal (max=5).

Figure 4:
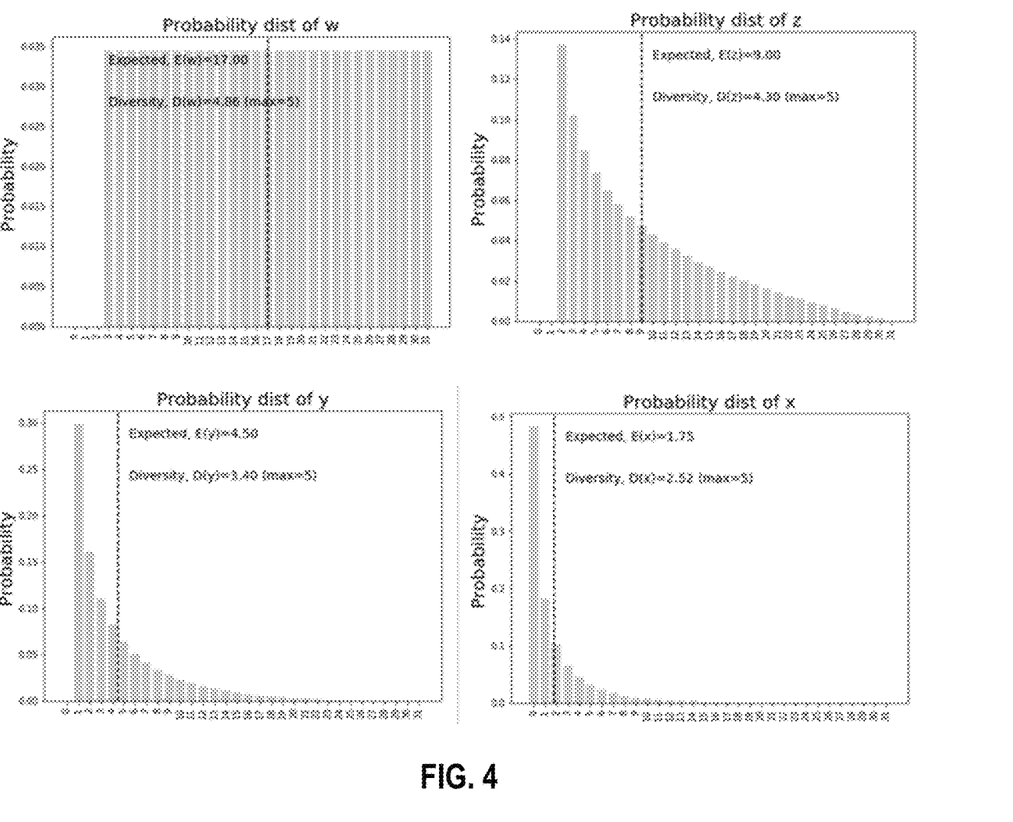
FIG. 4 illustrates a skewed distribution in accordance with some embodiments described herein.

FIG. 4 illustrates a skewed distribution in accordance with some embodiments described herein. The values of the variables are along the x-axis, and the probability values are along the y-axis. Low diversity typically is indicative of repetition of input stimuli, which clearly implies wasted simulation effort and low coverage.

To confirm the said limitation empirically, an experiment was conducted on the same example in the CRV framework (using VCS®) with 20 random-seeded runs×10,000 randomizations per run. The probability distribution from the simulation closely matched the theoretical results shown in FIG. 4. It was observed that the diversity remained low with the current approach even across runs with different random seeds, validating an inherent (theoretical) limitation of current approaches.

Figure 6:
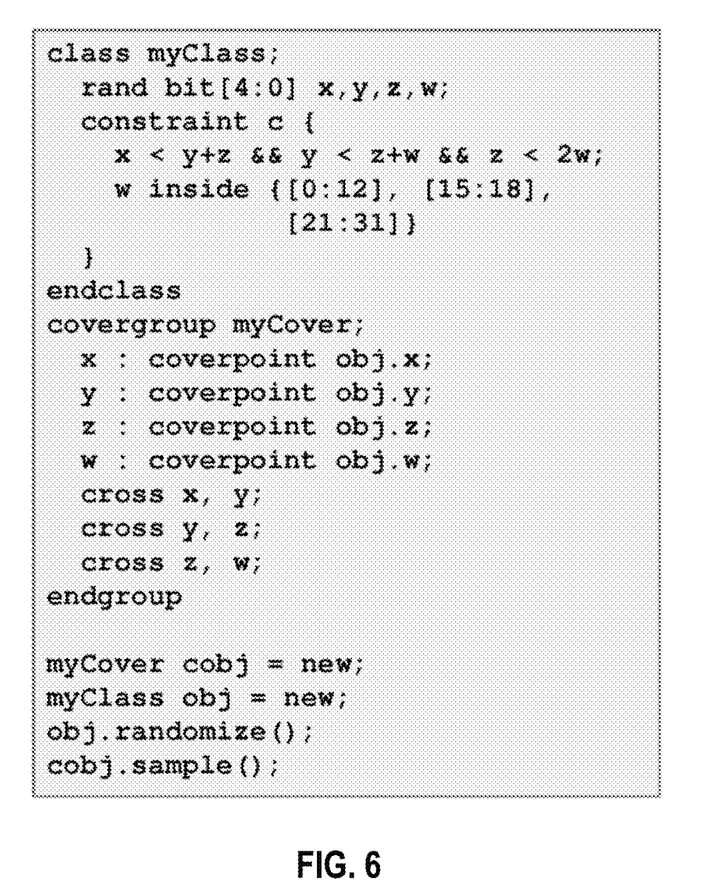
FIG. 6 illustrates a set of input constraints in accordance with some embodiments described herein.

To empirically validate the hypothesis on this example, the coverage score (using VCS® command: "urg-show ratios") was computed as shown in FIG. 6 with Default (top) and InputBias (bottom). It is shown that the diversity improvement also translates to improvement of coverage goals. It will be shown later that it is not just a coincidence.

Skewed Distribution Due to "Dist"

Figure 5:
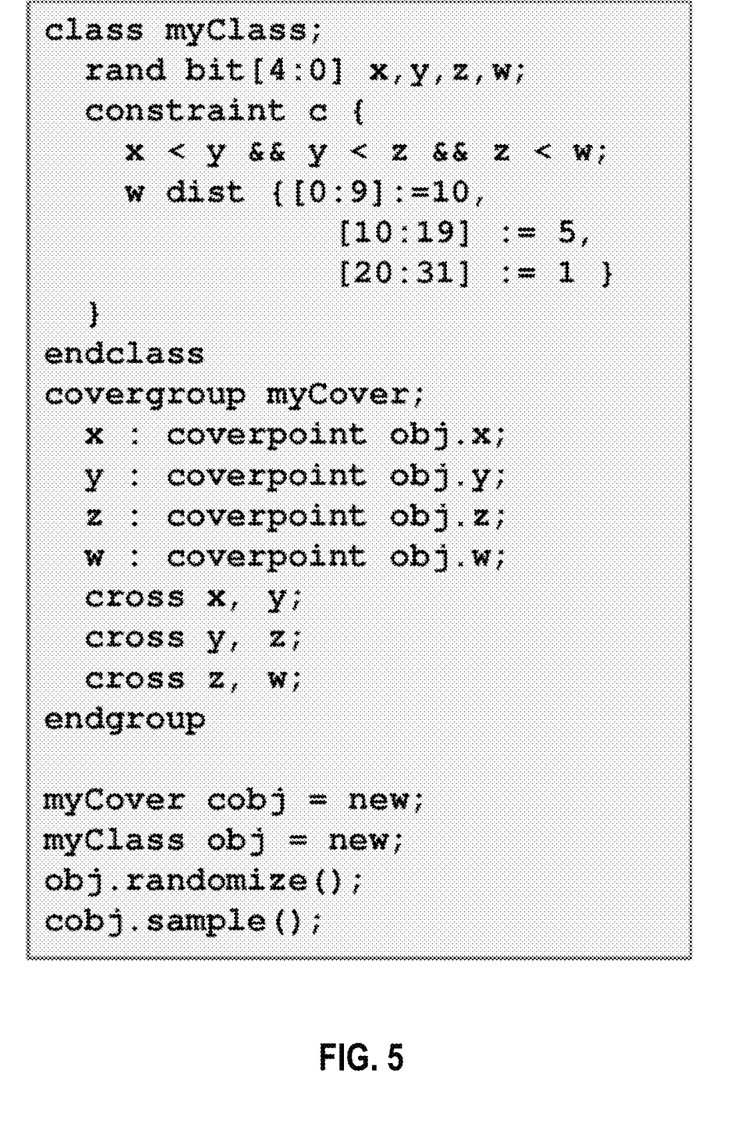
FIG. 5 illustrates a set of input constraints in accordance with some embodiments described herein.

FIG. 5 illustrates a set of input constraints in accordance with some embodiments described herein. Consider the example shown in FIG. 5 with the dist constraint on variable w. A similar experiment as before was conducted on the constraints shown in FIG. 5, and the distribution of the current approach provides empirical evidence that the dist constraints affect the quality of the distribution produced by the default approach, leading to skewed distribution, low diversity, and low coverage. Embodiments described herein mitigate such issues, which was confirmed through experimentation.

Skewed Distribution Due to Solver Bias

FIG. 6 illustrates a set of input constraints in accordance with some embodiments described herein. Consider the example shown in FIG. 6 to show the limitation due solver's preferred ordering. Again, a similar experiment as before was conducted, and the distribution provided empirical evidence that the solver's internal preference to certain variable ordering adversely affects the quality of the distribution produced by the default approach, leading to skewed distribution, low diversity, and low coverage. Embodiments described herein mitigate such issues, which was confirmed through experimentation.

Moreover, due to performance reasons, the current approaches do not provide full visibility of the distribution of input stimuli. Such a visibility would otherwise help users to spot over-constraints in the testbench. Embodiments described herein address the above-mentioned issues in CRV without compromising the scalability and performance in any significant manner.

Figure 7:
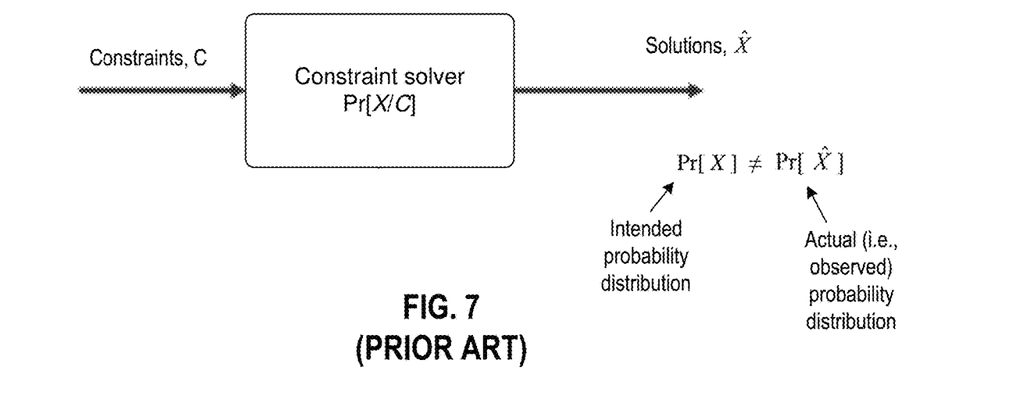
FIG. 7 illustrates a block diagram for an existing constraint solver.

FIG. 7 illustrates a block diagram for an existing constraint solver. The constraint solver solves the given constraints C and generates a solution which is represented as $<\hat{X}>$, wherein the actual probability distribution does not match the intended probability distribution, i.e., $\Pr[\hat{X}] \neq \Pr[X]$. In existing solvers, the probability distribution that the constraint solver uses to select variable values is fixed and is typically a uniform distribution. As explained above, in existing constraint solvers, the distribution of the variables is skewed by some preferred ordering of variables which are induced by constraints such as solve before, dist, and solver's affinity to certain variable ordering due to tight time budget. Existing constraint solvers lack an active feedback mechanism to rectify the skewed distribution.

Embodiments described herein provide techniques and systems to efficiently compensate the unintended skewed stimuli distribution on-the-fly during the constrained random stimulus generation by monitoring and learning the distribution history and biasing the constrained random stimulus solver to match the expected diversity in the stimuli distribution, in both intra- and inter-simulation runs, and thereby, effectively help in faster coverage closure.

As explained above, the input bias module constantly monitors and learns the distribution generated by the constraint solver, computes the compensated distribution on-the-fly, and biases the solver with the on-the-fly compensated distribution to nullify the skewedness in the distribution and to match the diversity in the generated stimuli distribution to that of expected distribution. It does so without changing the decision ordering of the solver to minimize any adverse side effect on the solver's tight time budget.

Figure 8:
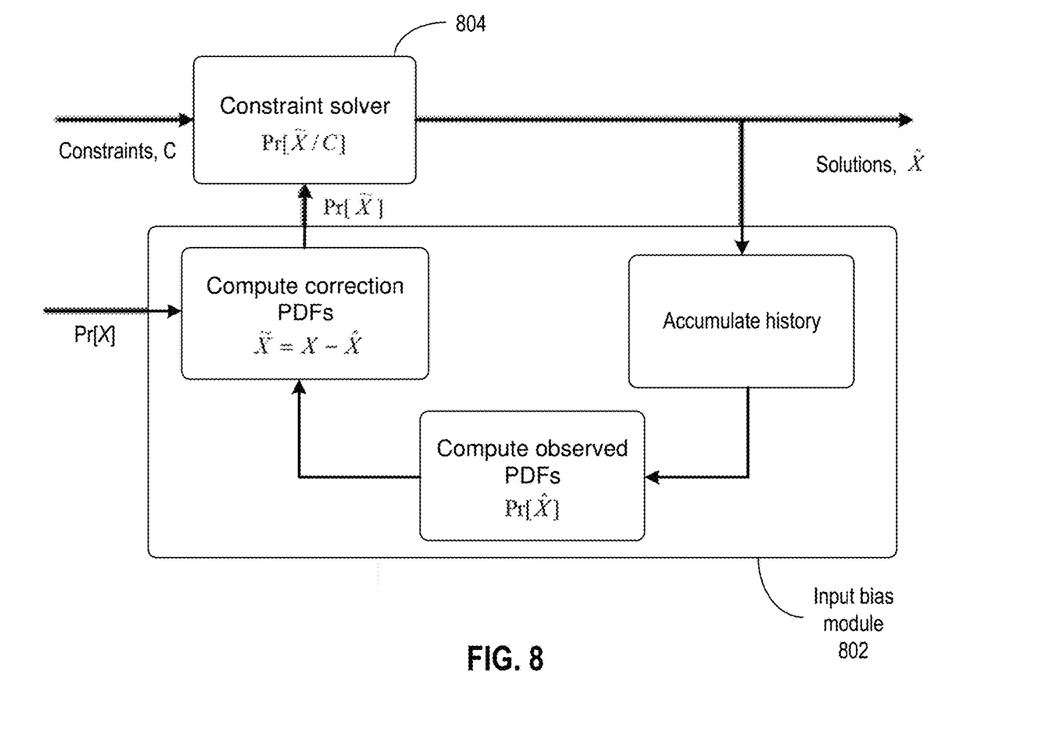
FIG. 8 illustrates how an input bias module can be used with a constraint solver in accordance with some embodiments described herein.

FIG. 8 illustrates how an input bias module can be used with a constraint solver in accordance with some embodiments described herein. In FIG. 8, an X without any accent refers to the intended (i.e., desired or target) probability distribution, an X with a caret accent (i.e., $\hat{X}$) refers to the actual solution (i.e., observed probability distribution), and an X with a tilde accent (i.e., $\tilde{X}$) refers to the compensated (or corrected) probability distribution. The "Accumulate History" block in input bias module 802 can efficiently store the history of the generated stimuli. The block can create a suitable number of singleton (i.e., single value) and interval (i.e., range values) bins per variable, and store the relative frequency of the bin value generated. The block can update the bins after each solve. After each solve, the "Computer Observed PDFs" block can compute the observed probability distribution based on the stored distribution history of the variables. After each solve, the "Compute Correction PDFs" block can compute "compensated" probability distribution of variables on-the-fly based on the observed and expected probability distribution. The compensated probability distribution aims to improve the diversity.

During the solve stage, as demanded, the input bias module randomly picks a value from a given value set of a variable based on the variable's compensated probability distribution. Alternatively, during the solve stage, as demanded, the input bias module randomly picks a range interval from a given set of range intervals for a variable based on the variable's compensated probability distribution. As shown in FIG. 8, constraint solver 804 selects a value for a variable based on the compensated probability distribution Pr[i].

After each simulation run, input bias module 802 can store the observed distribution of variables in the disk. Before a subsequent simulation run, the input bias module can load the last observed distribution from the disk. This allows the distribution history to be used within one simulation run and across multiple simulation runs.

Collection of Distribution History

The preferred embodiment is scalable to constraints with many variables, in the order of millions or more. To efficiently scale at the level, the distribution history is stored compactly. The following design choices are based on the observation that small integral values (with the range [−32:32]) are typically control and enum types, while the large variables values correspond to data signal values or bit selects. There are two types of bins:

Singleton bin: Corresponds to a single value bin that stores the frequency of occurrence of that stimuli value.

Interval bin: Corresponds to a power 2 interval $[2^i, 2^{i+1}]$ bin that storing the frequency of occurrence of the stimuli value in that range.

The precision of the variable determines the number of bins. Table 1 gives the layout and number of bins created for a variable with precision b. Each bin is 1-byte and maintains the relative ratio of occurrence of variable values, rather than the absolute count of occurrences (to prevent overflowing). There are some preferred handling methods but other handling methods could also be used:

1) Signed variables have twice the number of bins than the unsigned variables for the same precision.
2) One bit is used to store the information whether the bin value was generated at least once or not.

For example, suppose the memory foot print per variable is (24+number of Bins) bytes. For 25K variables that are signed 8-bit would require (24+38)*25K=~1.5 Mb.

Figure 9:
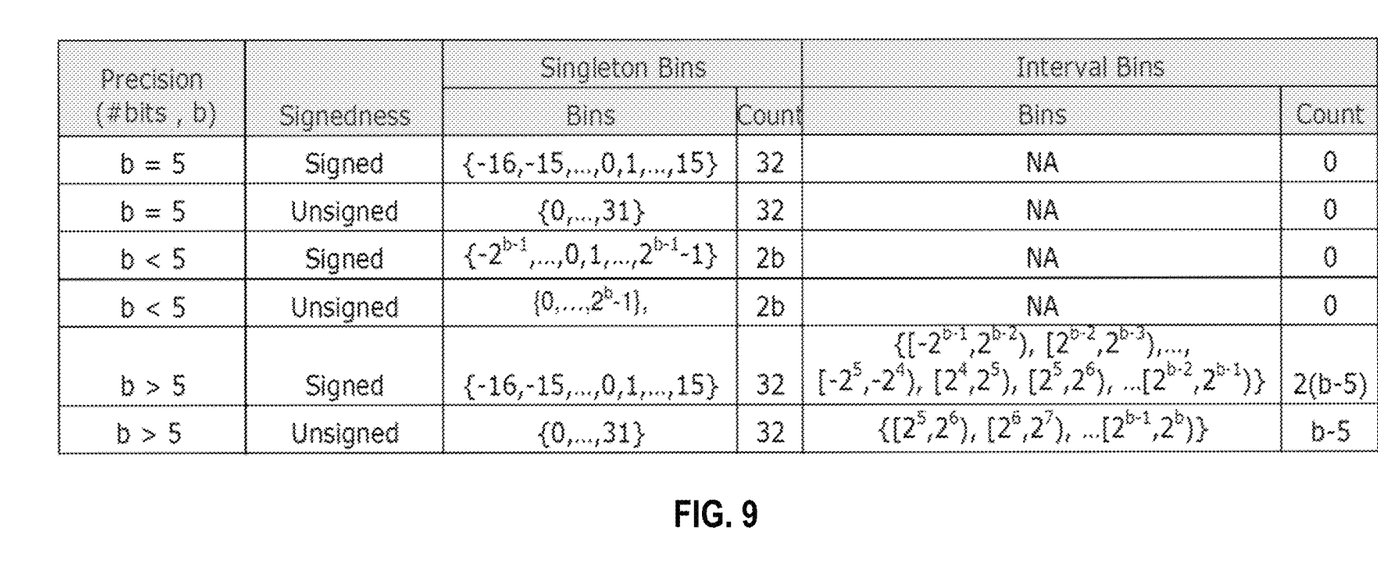
FIG. 9 illustrates binning for a variable with precision of b bits in accordance with some embodiments described herein.

FIG. 9 illustrates binning for a variable with precision of b bits in accordance with some embodiments described herein.

Computation of the Observed Probability Distribution

Given a distribution history $\{w_i\}$ of a set of bins $\{i\}$ of a variable where $w_i \in \mathbb{Z}_0^+$ (i.e., non-negative integers), corresponds to the normalized count of the bin i.

The probabilities $\{p_i\}$ of the bins is computed as the ratio of count of a bin to the sum of all counts of the bins for that variable, i.e., $$p_i = \frac{w_i}{\sum w_j}.$$

Computation of the Compensated PDF

Given an expected distribution $\{u_i\} u_i \in \mathbb{Z}^+$ (i.e., positive integers) for a finite set of bins $\{i\}$, and the corresponding cumulated distribution history of generated stimuli $\{w_i\} w_i \in \mathbb{Z}_0^+$ (i.e., non-negative integers), we compute the compensated probabilities by first computing the weighted compensated distribution $\{v_i\}$ and then generating probabilities $\{p_i\}$ for the bins as follows:

$$v_i = u_i - \frac{w_i}{\sum w_j} \quad \text{(Equation 1)}$$

$$p_i = \frac{v_i}{\sum v_j} \quad \text{(Equation 2)}$$

It can be proven that $\{p_i\}$ computed by the above Equations (1) and (2) compensates correctly the skewed distribution $\{w_i\}$ to achieve the expected (or intended) distribution $\{u_i\}$.

Selection of a Value Randomly in the Given Interval

Given an interval of values [L:H] (L, H inclusive) and a compensated probability distribution $\{p_i\}$ for that variable, the goal is to select a value randomly from the range.

First obtain a set of bins $\{k | val \in [L:H] \cap val \in k\}$. Note, that $\{k\} \subseteq \{i\}$. Let $\{p'_k\}$ represent the compensated (or corrected) prob. distribution of the bins $\{k\}$, and is computed as follows:

$$p'_j = \frac{p_j}{\sum_k p_k}, \sum p'_k = 1$$

Given a prob. distribution $\{p'_k\}$, a bin j is obtained randomly using a uniform random number generator in the real range [0,1], i.e., $$\text{Select}(\{k\}) = \left\{ j \left| \min_j \left( \sum_{k=1}^{j} p'_k \geq R \right) \right. \right\}.$$

where: R=urand(0,1)

If selected j is a singleton bin, then we return the corresponding bin value, otherwise, we randomly select a value uniformly in the interval corresponding to the bin j.

Selection of an Interval from a Given Set of Intervals

Given a set of intervals $\{I\}$ and a compensated probability distribution $\{p_i\}$ for that variable, the goal is to select an interval from the set. For each interval I in the set, first obtain a set of bins $\{k | val \in I \cap val \in k\}$. Note, that $\{k\} \subseteq \{i\}$. Let $p_I = \sum_k p_k$ represent the aggregated weights of the interval I. The compensated prob. distribution $\{p'_I\}$ of the bins $\{k\}$ is computed as follows:

$$p'_I = \frac{p_I}{\sum_J p_J}, \sum p'_I = 1$$

Given a prob. distribution $\{p'_I\}$, select an interval I randomly using a uniform random number generator in the real range [0,1], i.e., $$\text{Select}(\{I\}) = \left\{ J \left| \min_J \left( \sum_{k=1}^{J} p'_k \geq R \right) \right. \right\},$$

where R=urand(0,1)

Selection of a Minterm Randomly for a Given Cube

Given a cube Q and a compensated probability distribution $\{p_i\}$ for that variable, the goal is to select a minterm randomly from the cube.

First obtain a set of bins {k|minterm∈ Q∩val∈k}. Note, that {k}⊆{i}. Let {p'$_k$} represent the compensated prob. distribution of the bins {k}, and is computed as follows:

$$p'_j = \frac{p_j}{\sum_k p_k}, \sum p'_k = 1$$

Given a prob. distribution {p'$_k$}, we obtain a bin j randomly using a uniform random number generator in the real range [0,1], i.e., $$\text{Select}(\{k\}) = \left\{ j \left| \min_j \left( \left[ \sum_{k=1}^{j} p'_k \geq R \right] \right) \right. \right\},$$

where R=urand(0,1)

If selected j is a singleton bin, then we return the corresponding bin value, otherwise, we randomly select a value uniformly in the interval corresponding to the bin j that is also a minterm of Q.

Selection of a Cube from a Given Set of Cubes

Given a set of cubes {Q} and a compensated prob. distribution {p$_i$} for that variable, the goal is to select a cube from the set.

For each cube Q in the set, first obtain a set of bins {k|minterm∈ Q∩val∈k}. Note, that {k}⊆{i}. Let p$_J$=Σ$_k$p$_k$ represent the aggregated weights of the cube Q. Compute the compensated prob. distribution {p'$_Q$} of the bins {k} as follows:

$$p'_Q = \frac{p_Q}{\sum_J p_J}, \sum p'_Q = 1$$

Given a prob. distribution {p'$_Q$}, we select a cube J randomly using a uniform random number generator in the real range [0,1], i.e., $$\text{Select}(\{Q\}) = \left\{ J \left| \min_J \left( \sum_{k=1}^{J} p'_k \geq R \right) \right. \right\},$$

where R=urand(0,1)

Process for Generating Constrained Random Stimuli

Some embodiments were implemented within the VCS® CRV framework to conduct various experiments. There was no change in the VCS® use model. Specifically, an experiment was conducted on an industry testbench with defined coverage groups using multiple (~120) runs with random seeds.

Figure 10A:
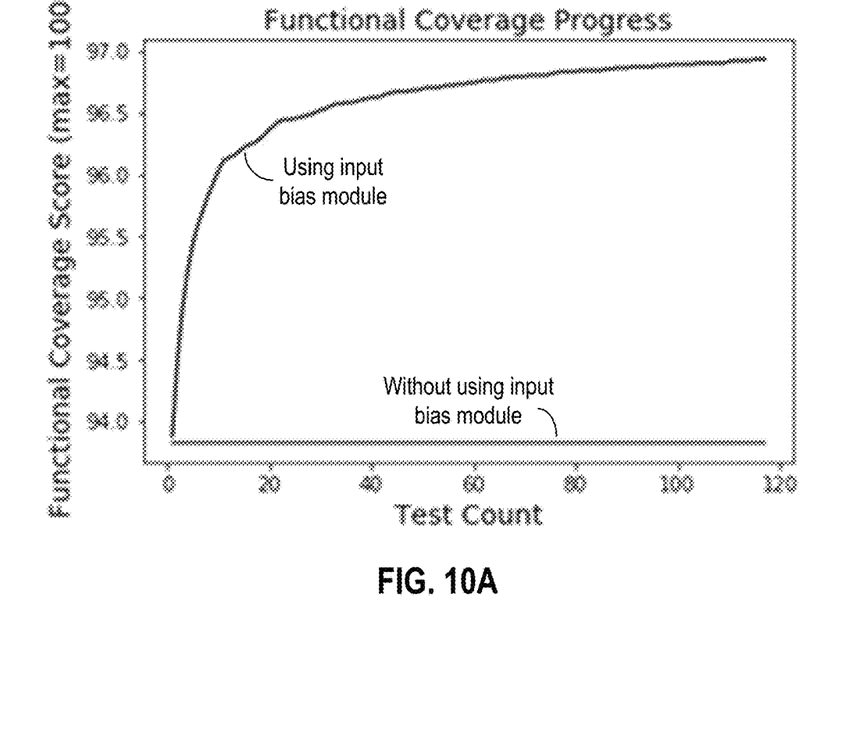
FIGS. 10A-10B illustrate functional coverage and simulation time plots in accordance with some embodiments described herein.
Figure 10B:
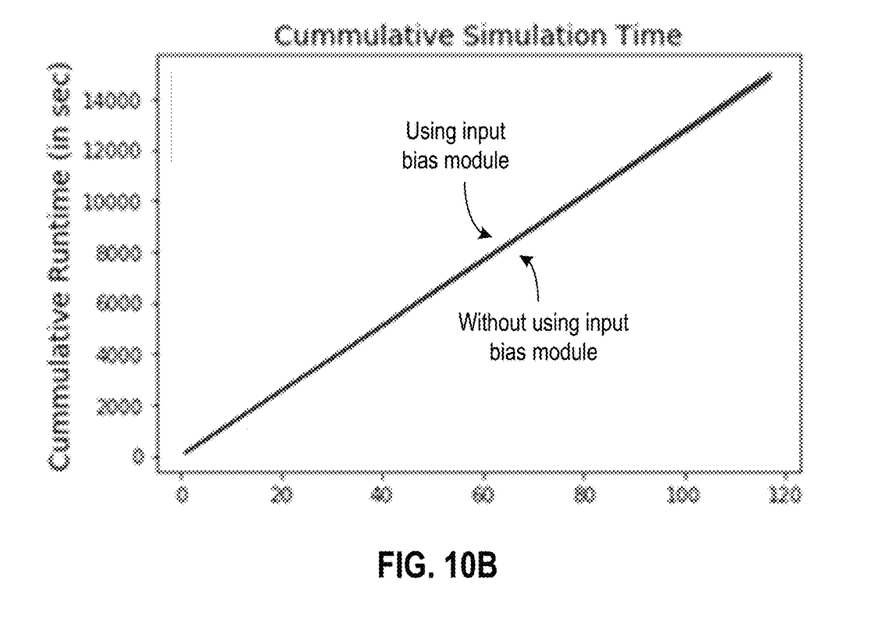

FIGS. 10A-10B illustrate functional coverage and simulation time plots in accordance with some embodiments described herein. As shown in FIG. 10A, while existing approaches reach a coverage plateau at score 93.83 (the "without using input bias module" line), embodiments described herein can improve the score to 96.92 for the same number of tests (the "using input bias module" curve). FIG. 10B illustrates the cumulative time taken by an existing approach (i.e., an approach that does not use an input bias module), and an embodiment described herein that uses an input bias module. As can be seen from FIG. 10 B, there does not appear to be any significant performance overhead due to the input bias module.

To reiterate, advantages of embodiments described herein include the following:

1) Reduces or eliminates a skewed distribution.
2) Learns from the history of distribution of variables and rectifies the skewedness in the distribution which are caused by ordering constraints, and solver's bias.
3) Compensates the skewed distribution on-the-fly during the solving.
4) Keeps the distribution history persistent across runs for subsequent reuse.
5) Retains the solver's ordering heuristic to minimize any adverse side effects on the solver's tight time budget.
6) Honors user-defined distribution.
7) Empirical data shows improvement in the diversity and coverage scores on various customer designs compared to the current approach.
8) Empirical data shows better scalability and quality of the distribution compared to the current approach relative to formal technology such as Echo.

Figure 11:
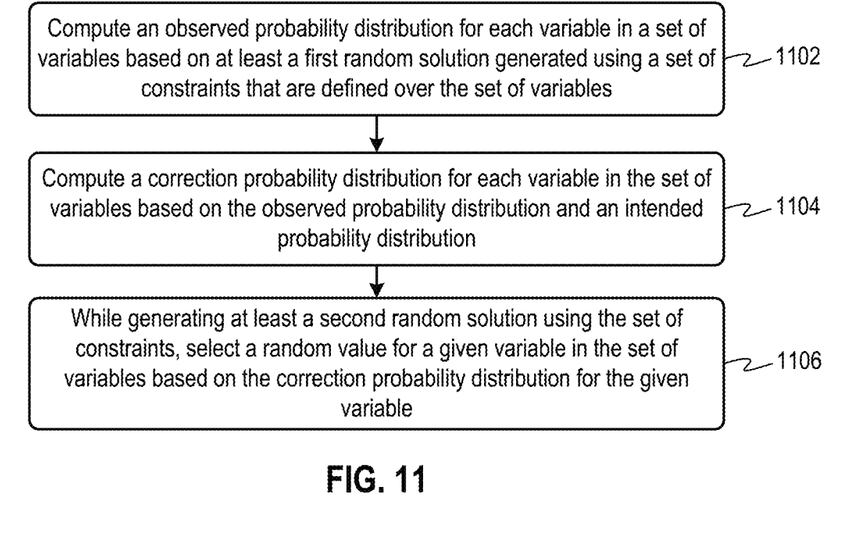
FIG. 11 illustrates a process for generating constrained random stimuli during functional verification of a DUV in accordance with some embodiments described herein.

FIG. 11 illustrates a process for generating constrained random stimuli during functional verification of a DUV in accordance with some embodiments described herein. The process can begin by computing an observed probability distribution for each variable in a set of variables based on at least a first random solution generated using a set of constraints that are defined over the set of variables (block 1102). The process can then compute a correction probability distribution for each variable in the set of variables based on the observed probability distribution and an intended probability distribution (block 1104). Next, while generating at least a second random solution using the set of constraints, the process can select a random value for a given variable in the set of variables based on (i.e., using) the correction probability distribution for the given variable (block 1106).

In some embodiments, random solutions can be generated by a constraint satisfaction problem solver. In some embodiments, the intended probability distribution can be a uniform or non-uniform probability distribution. In some embodiments, using the correction probability distribution to select random values for variables can increase a diversity of the observed probability distribution as measured by Shannon entropy. In some embodiments, using the correction probability distribution to select random values for variables is expected to cause a Shannon entropy of the observed probability distribution to substantially match a Shannon entropy of the intended probability distribution. In some embodiments, the corrected probability distribution can be applied at a plurality of simulation states of the DUV. In some embodiments, the observed probability distribution can be computed over one or more simulation runs of the DUV. In some embodiments, the one or more simulation runs of the DUV can use different sets of constraints.

Figure 12:
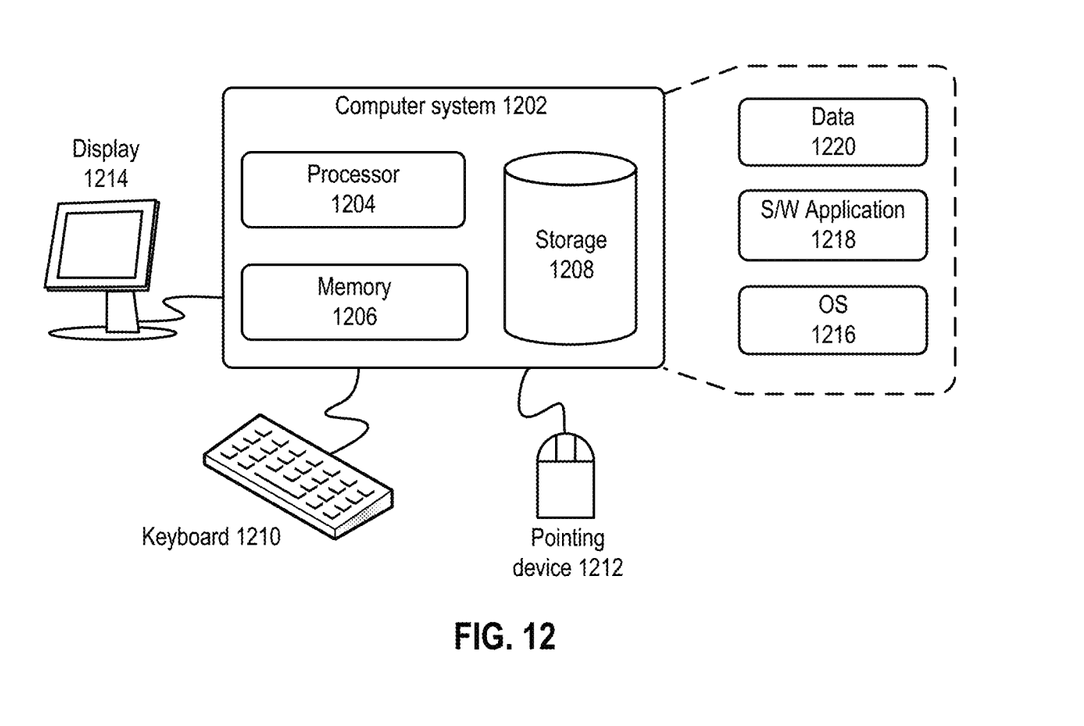
FIG. 12 illustrates a computer system in accordance with some embodiments described herein.

FIG. 12 illustrates a computer system in accordance with some embodiments described herein. The term "computer" or "computer system" generally refers to a hardware-based system that can perform computations required for the design and manufacture of ICs. Computer system 1202 can include processor 1204, memory 1206, and storage device 1208. Computer system 1202 may include multiple processors, and processor 1204 may include multiple cores. Specifically, memory locations in memory 1206 can be addressable by processor 1204, thereby enabling processor 1204 to access (e.g., via load/store instructions) and manipulate (e.g., via logical/floating point/arithmetic instructions) the data stored in memory 1206. Computer system 1202 can be coupled to display device 1214, keyboard 1210, and pointing device 1212. Storage device 1208 can store operating system 1216, software application 1218, and data 1220. Data 1220 can include input required by software application 1218 and/or output generated by software application 1218.

Computer system 1202 may automatically (or with user help) perform one or more operations that are implicitly or explicitly described in this disclosure. Specifically, computer system 1202 can load software application 1218 into memory 1206, and software application 1218 can then be used to generate constrained random input stimuli for verifying a DUV. The resulting IC design is expected to have better performance and/or quality of results (QoR) because embodiments described herein were used to generate constrained random input stimuli for verifying a DUV, thereby causing the DUV to be more thoroughly tested.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('APP') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract' } how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a THOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable storage medium storing instructions that, when executed by a computer, cause the computer to perform a method for generating constrained random stimuli during functional verification of a design under verification (DUV), the method comprising:

computing an observed probability distribution for each variable in a set of variables based on at least a first random solution generated using a set of constraints that is defined over the set of variables;

computing a correction probability distribution for each variable in the set of variables based on the observed probability distribution and an intended probability distribution; and while generating at least a second random solution using the set of constraints, selecting a random value for a given variable in the set of variables based on the correction probability distribution for the given variable.

2. The non-transitory computer-readable storage medium of claim 1, wherein random solutions are generated by a constraint satisfaction problem solver.

3. The non-transitory computer-readable storage medium of claim 1, wherein the intended probability distribution is a uniform probability distribution.

4. The non-transitory computer-readable storage medium of claim 1, wherein the intended probability distribution is a non-uniform probability distribution.

5. The non-transitory computer-readable storage medium of claim 1, wherein using the correction probability distribution to select random values for variables increases a diversity of the observed probability distribution as measured by Shannon entropy.

6. The non-transitory computer-readable storage medium of claim 5, wherein using the correction probability distribution to select random values for variables is expected to cause a Shannon entropy of the observed probability distribution to substantially match a Shannon entropy of the intended probability distribution.

7. The non-transitory computer-readable storage medium of claim 1, wherein the corrected probability distribution is applied at a plurality of simulation states of the DUV.

8. The non-transitory computer-readable storage medium of claim 1, wherein the observed probability distribution is computed over one or more simulation runs of the DUV.

9. The non-transitory computer-readable storage medium of claim 8, wherein the one or more simulation runs of the DUV use different sets of constraints.

10. The non-transitory computer-readable storage medium of claim 1, wherein the observed probability distribution is continuously updated and stored as the constrained random stimuli are generated.

11. An apparatus, comprising:
a processor; and
a non-transitory computer-readable storage medium storing instructions that, when executed by the processor, cause the apparatus to perform a method for generating constrained random stimuli during functional verification of a design under verification (DUV), the method comprising:
computing an observed probability distribution for each variable in a set of variables based on at least a first random solution generated using a set of constraints that is defined over the set of variables;

computing a correction probability distribution for each variable in the set of variables based on the observed probability distribution and an intended probability distribution; and while generating at least a second random solution using the set of constraints, selecting a random value for a given variable in the set of variables based on the correction probability distribution for the given variable.

12. The apparatus of claim 11, wherein random solutions are generated by a constraint satisfaction problem solver.

13. The apparatus of claim 11, wherein the intended probability distribution is a uniform probability distribution.

14. The apparatus of claim 11, wherein the intended probability distribution is a non-uniform probability distribution.

15. The apparatus of claim 11, wherein using the correction probability distribution to select random values for variables increases a diversity of the observed probability distribution as measured by Shannon entropy.

16. The apparatus of claim 15, wherein using the correction probability distribution to select random values for variables is expected to cause a Shannon entropy of the observed probability distribution to substantially match a Shannon entropy of the intended probability distribution.

17. The apparatus of claim 11, wherein the corrected probability distribution is applied at a plurality of simulation states of the DUV.

18. The apparatus of claim 11, wherein the observed probability distribution is computed over one or more simulation runs of the DUV.

19. The apparatus of claim 18, wherein the one or more simulation runs of the DUV use different sets of constraints.

20. The apparatus of claim 11, wherein the observed probability distribution is continuously updated and stored as the constrained random stimuli are generated.

21. A method for generating constrained random stimuli during functional verification of a design under verification (DUV), the method comprising:
computing, by using a processor, an observed probability distribution for each variable in a set of variables based on at least a first random solution generated using a set of constraints that is defined over the set of variables;

computing a correction probability distribution for each variable in the set of variables based on the observed probability distribution and an intended probability distribution;

while generating at least a second random solution using the set of constraints, selecting a random value for a given variable in the set of variables based on the correction probability distribution for the given variable; and wherein the observed probability distribution is continuously updated and stored as the constrained random stimuli are generated.

* * * * *